(No Model.)
V. BLUTHGEN.
ORNAMENTATION OF GLASSWARE, &c.
No. 293,408.          Patented Feb. 12, 1884.
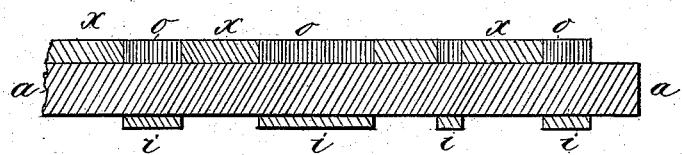
Witnesses
W. E. Boulter.
H. A. Daniels
Inventor
Victor Bluthgen

United States Patent Office.

VICTOR BLÜTHGEN, OF FREIENWALDE-ON-THE-ODER, PRUSSIA, GERMANY.

ORNAMENTATION OF GLASSWARE, &c.

SPECIFICATION forming part of Letters Patent No. 293,408, dated February 12, 1884.

Application filed October 6, 1883. (No model.) Patented in England September 26, 1883, No. 4,589; in Italy September 26, 1883, XXXII, 36, XVII, 15,946; in France September 26, 1883, and in Belgium September 26, 1883.

*To all whom it may concern:*

Be it known that I, VICTOR BLÜTHGEN, a subject of the King of Prussia, residing at Freienwalde-on-the-Oder, Prussia, German Empire, have invented certain new and useful Improvements in the Ornamentation of Glassware and the like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to a novel process of producing colored designs on glass, ceramic products, and other articles; and it has for its object the production of imitation painted glass that possesses all the characteristic features of the genuine painted glass.

The invention has for its further object to provide a means whereby glass or glassware, ceramic products, or plaster casts may be rapidly ornamented or decorated at comparatively little expense.

In the production of colored ornaments or pictures I employ in all cases artificially-colored transparent gelatinous substances—as, for instance, collodion or gelatine—either of vegetable or animal origin, which, when applied to the glass, either by causing the same to flow thereon while in a fluid state or otherwise, will form a transparent or translucent colored coating or layer, and whereby section lines, or boundaries, or outlines may be formed on plates of glass either by means of metal foil, by the helioplastic or other like process, or by means of the previously-applied colored coating, in the latter case any excess being removed by cutting out or scraping.

In the ornamentation of glass or glazed or enameled surfaces, the surfaces to be ornamented must first be treated or cleaned in the same manner as for photolithographic purposes, (a treatment which is well known and need not here be described,) to cause the gelatinous substance to firmly adhere to the surface to which it is applied. The drawing, and consequently the outlines of the colored pattern in black or other dark tint, is applied by hand or by mechanical means, in the well-known manner, to the surface to be ornamented before the colored gelatinous substance is applied thereto. In the ornamentation of glass I prefer to apply the design to the back of the plate, though it may be applied to the front thereof, and in either case the said design will be seen through the colored gelatinous coating, so that the whole will have the appearance of painted glass.

In order that my invention may be better understood, I will describe the same in relation to the production of a glass painting, referring to the annexed drawing, which illustrates in section and on a greatly exaggerated scale a portion of a plate of glass ornamented by my process.

In the drawing, $i\ i$ indicate portions of the back of the glass plate $a$, upon which the design is applied in the usual color—say black, for instance—the corresponding front portions being covered by a layer or section, $o$, that separates the sections $x$ from one another.

The sections $o$ may be formed in various ways, as above described—for instance, by forming upon the outer face of the plate of glass, previously treated as described, a film or layer of uncolored gelatine, and allow the same to cool and become stiff or rigid, then removing those sections, $x$, thereof which are afterward to be filled with colored gelatine.

After the several or individual sections or fields of the painting have been produced as described, they are filled with gelatine of the desired color or colors. When two or more different colors are to be brought in immediate contact in the same field or section, the latter is first coated with gelatine of one color; then those parts of the section which are to be of a different color are removed after the gelatine has become stiff, and the places are coated with gelatine of the color required. The smaller portions of a section may also be coated by the application of the gelatine with a brush, and the coat or layer of gelatine may be composed of several superposed layers of gelatine of different colors. To produce still better effects in the ornamentation of transparent or translucent articles, both sides of the same may be colored in the manner described.

When the ornamentation of the article has been completed, the gelatine is coated with a transparent varnish, or a second plate of glass may be applied to the ornamented side of a glass plate to protect the gelatine.

Having thus fully described my invention, what I claim, and desire to secure by Letters Patent of the United States, is—

The process of producing colored ornamentations upon glass, ceramic products, or other objects, which consists in applying a gelatinous substance that will produce a rigid or stiff transparent or translucent coating upon an object to which the design has previously been applied, as set forth, and that, in combination with said design, will bring out the character of the colored ornamentation or picture, as described, for the purpose specified.

In testimony whereof I affix my signature in presence of two witnesses.

VICTOR BLÜTHGEN.

Witnesses:
A. DEMELIUS,
B. ROI.